April 12, 1932. H. A. SALLOP 1,853,579
COMBINATION AUTOMOBILE SEAT COVER
Filed July 8, 1931 2 Sheets-Sheet 1

INVENTOR.
Harry A. Sallop
BY
Wm. R. Smith
ATTORNEY.

April 12, 1932. H. A. SALLOP 1,853,579
COMBINATION AUTOMOBILE SEAT COVER
Filed July 8, 1931 2 Sheets-Sheet 2
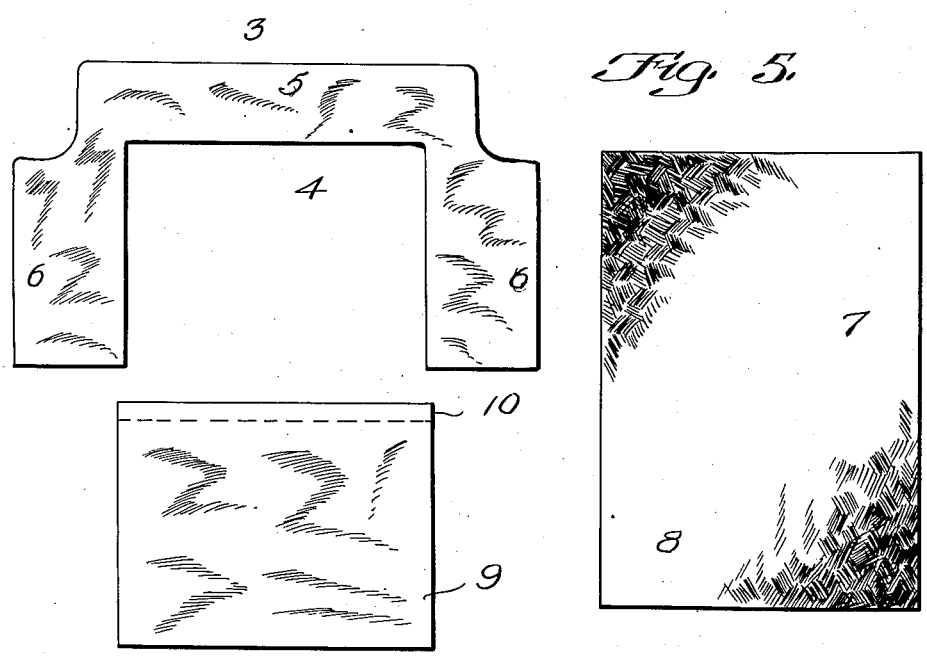
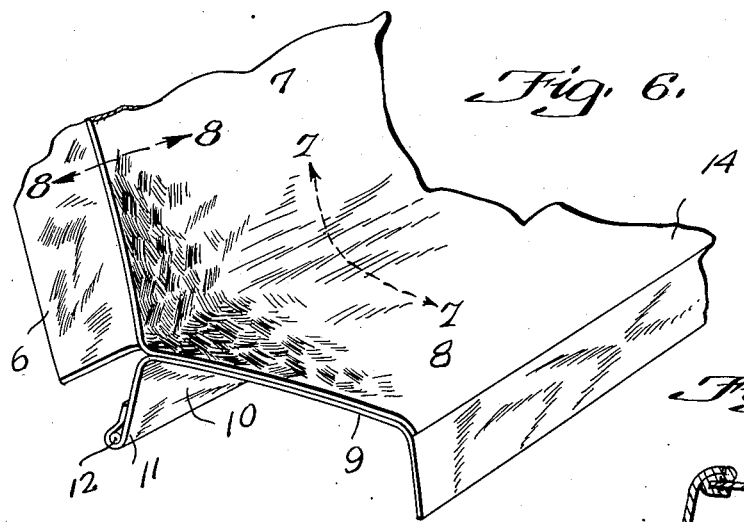
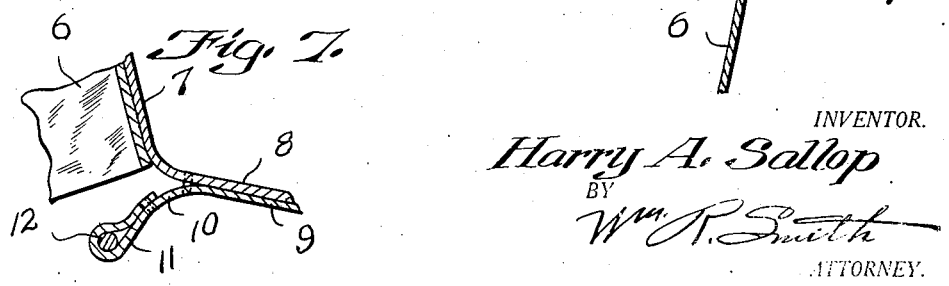
INVENTOR.
Harry A. Sallop
BY
Wm. R. Smith
ATTORNEY.

Patented Apr. 12, 1932

1,853,579

UNITED STATES PATENT OFFICE

HARRY A. SALLOP, OF NEW YORK, N. Y.

COMBINATION AUTOMOBILE SEAT COVER

Application filed July 8, 1931. Serial No. 549,435.

This invention relates to an automobile seat covering and has for its primary object the construction of a combination seat covering that may be converted for summer or winter use when in applied position and will have a neat attractive appearance.

An object of the invention is the provision of a main cover of fabric material and an auxiliary cover unit of woven material arranged in a novel relation whereby the exposed surface characteristics of the cover may be changed for adapting the same for hot and cold weather use.

Another object of the invention resides in the combination and novel relation of the various cover sections so that they may be adaptably related and held in adjusted position by a slide type of fastener.

A very important feature of my invention resides in a one piece formation of the panel for coverage of the back and cushion of the seat structure and providing by its own material at an intermediate point a hinge connection for facilitating the folding of the panel.

Besides the above my invention is distinguished in a design of seat covering, utilizing in the combination a slide type of fastener whereby an auxiliary cover section may be selectively moved into engagement with the back of an automobile seat or the cushion thereof.

With these and other objects in view the invention will be better understood from the following detailed description taken in conjunction with the following drawings, wherein:

Figure 5 is a grouped view of the separated parts of the main cover section.

Figure 6 is a fragmentary perspective view.

Figure 7 is a sectional view on line 7—7, Figure 6.

Figure 8 is a sectional view on line 8—8, Figure 6.

Figure 1:
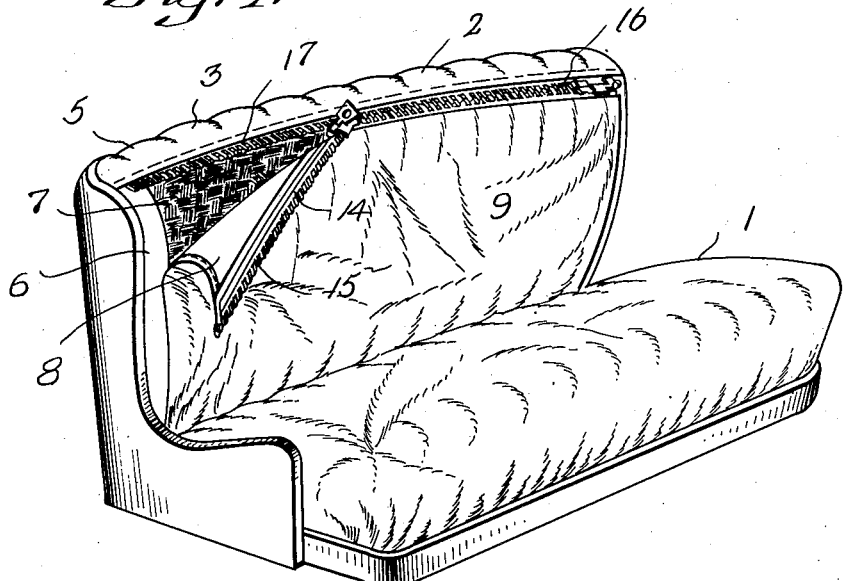
Figure 1 is a perspective view of the combination seat covering in applied position.
Figure 2:
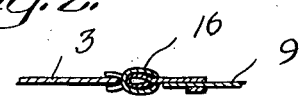
Figure 2 is a sectional view through the slide fastener.
Figure 3:
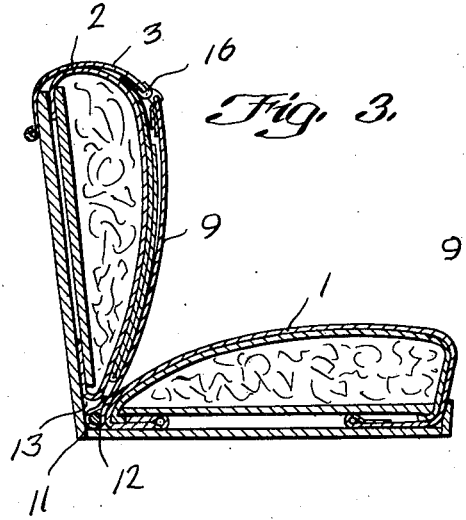
Figure 3 is a cross sectional view showing the auxiliary seat section covering the back of the seat structure.
Figure 4:
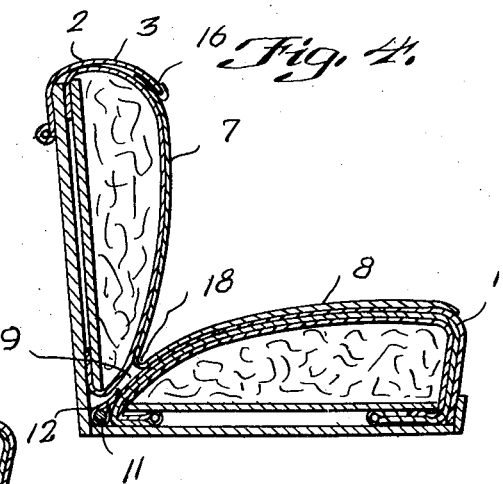
Figure 4 is a view similar to Figure 3 showing the auxiliary cover section in engagement with the cushion of the automobile seat structure.

Again referring to the drawings, the numeral 1 designates the cushion section and numeral 2 the main cover section or member which is attached to the back of the seat structure in any suitable manner. The main cover section 2 consists of a border strip 3 defining an opening 4 and providing a cross flap 5 and side flaps 6. The cross flap 5 is adapted to extend across the top edge of the seat back and the flaps 6 are adapted to be tucked around the ends of the seat back in a manner well known in the art.

A panel 7 formed from woven material such as straw matting is of a width and length to cover the opening 4 and be secured to the flaps 5 and 6 and further to provide an extension 8 of an area to approximately cover the cushion section 1 when moved thereover in a manner now to be described. An auxiliary cover section 9 formed from fabric, the same material from which the cover section is formed, is directly stitched or secured in any suitable manner to the extension 8. The section 9 is provided with a flap 10 terminating in a seam 11 in which is arranged a rod 12 for facilitating the wedging of the flap 10 between the cushion of the seat structure and the back of the seat structure as indicated at 13. The free edge 14 of the auxiliary cover section 9 is provided with one set of fastener elements 15, or a slide fastener 16, the other set 17 of which are secured to the border strip 3. As the slide fastener is designed to completely detach one set of fastening elements from the other, it will be appreciated that the cover section 9 may be arranged in covering relation with the main cover section 2 or in covering relation with the cushion section 1.

A very important feature of my invention resides in the one piece formation of the panel 7 which is creased at an intermediate point 18 to facilitate the folding of the extension 8 in parallel relation with that portion of the panel secured to the main cover section 2. As the flap 10 is arranged at the creased formation 18 of the panel a neat hinge effect is accomplished for the selective movement of the auxiliary cover section 9, into cooperative relation with the main cover section 2 and cooperative relation with the cushion of the automobile seat. Due to the formation of the border strip the auxiliary cover section 9 and the panel 7 and method of attachment to each other, the cost of manufacture is materially reduced, while at the same time giving a one piece formation to the back and seat portion of the panel 7.

Of course, it is to be understood that the various parts may be designed in other relations than illustrated and connected in other manners and therefore I do not desire to be limited in protection in any manner whatsoever, except as set forth in the following claims.

What I claim is:

1. A combination automobile seat covering comprising a main cover section and an auxiliary cover section, said main cover section consisting of a border strip for attachment to the back of an automobile seat structure and a one piece panel secured to the border strip and of a length to cover one side of said auxiliary cover section, said auxiliary cover section adapted to be extended over the main cover section or over the cushion of the seat structure.

2. A combination automobile seat covering comprising a main cover section for attachment to the back of an automobile seat structure and an auxiliary cover section adapted to be extended over the main cover section or over the cushion of the automobile seat structure, said main cover including a border strip and a one piece panel of a width and length to be secured to the border strip and to extend over and cover the entire area of one side of said auxiliary cover section.

3. A combination automobile seat covering comprising a main cover section for attachment to the back of an automobile seat structure and an auxiliary cover section adapted to be extended over the main cover section or over the cushion of the automobile seat structure, said main cover including a border strip and a one piece panel of a width and length to be secured to the border strip and to extend over and cover the entire area of one side of said auxiliary cover section and an attachable flap extending from said auxiliary cover section and adapted for wedging engagement with a portion of the automobile seat structure.

In witness whereof I have hereunto set my hand.

HARRY A. SALLOP.